United States Patent [19]

Vachon

[11] Patent Number: 4,554,977
[45] Date of Patent: Nov. 26, 1985

[54] COMBINED HARROW AND HARROW BAR

[75] Inventor: Bertrand Vachon, Thetford Mines, Canada

[73] Assignee: Ber-Vac Inc., Thetford Mines, Canada

[21] Appl. No.: 590,266

[22] Filed: Mar. 16, 1984

[51] Int. Cl.[4] ............................................. A01B 49/02
[52] U.S. Cl. .................... 172/177; 172/179; 172/198; 172/657
[58] Field of Search .............. 172/177, 179, 615, 619, 172/624, 657, 198

[56] References Cited

U.S. PATENT DOCUMENTS

| | | | |
|---|---|---|---|
| 772,529 | 10/1904 | McCain | 172/177 |
| 1,867,521 | 7/1932 | Mote | 172/657 |
| 3,991,831 | 11/1976 | Foster | 172/198 |
| 4,204,579 | 5/1980 | Rau | 172/657 |

FOREIGN PATENT DOCUMENTS 209121 1/1924 United Kingdom ............... 172/657

Primary Examiner—Richard J. Johnson
Attorney, Agent, or Firm—Robic, Robic & Associates

[57] ABSTRACT

A cultivator of the type having a vertically movable harrow bar followed by a vertically movable harrow roller. A plurality of springs biases the roller down against the ground. The springs are operatively connected to the harrow bar in a manner to have vertical movement of the bar automatically vary the pressure exerted by the roller.

1 Claim, 2 Drawing Figures

COMBINED HARROW AND HARROW BAR

The present invention relates an improved cultivator.

The invention more particularly relates to an improved cultivator of the type having first cultivating means followed by second cultivating means spaced rearwardly of the first cultivating means.

Cultivators employing first and second cultivating means to more thoroughly break up the soil to prepare it for chemical treatment and/or seeding, are well known in the art. The first cultivating means usually comprises a harrow bar comprising a row of tines for loosen the soil. The following second cultivating means comprises a cylindrical harrow which rolls the loosened soil, breaking it up and compacting it. Resilient means are normally provided to bias the cylindrical harrow downwardly to obtain good contact with the soil.

In travelling over uneven ground however, the pressure exerted by the cylindrical harrow is uneven and thus the soil cultivation is not uniform.

It is therefore the object of the present invention to provide an improved cultivator wherein means are provided for ensuring that the cultivation of the soil is more uniform particularly when travelling over uneven ground.

More particularly, it is the object of the present invention to provide means on a cultivator of the type employing a spring-biased cylindrical harrow which ensures that the pressure applied by the cylindrical harrow is more uniform when travelling over uneven ground.

In accordance with the present invention, the resilient means normally used to bias the cylindrical harrow downwardly are mounted so as to automatically adjust the pressure they exert on the cylindrical harrow when travelling over uneven ground. The harrow bar just in front of the cylindrical harrow are mounted so they can move up and down to follow the contour of the land. The resilient means are connected between the harrow bar and the cylindrical harrow. As the harrow bar moves up a ridge on uneven ground, its upward movement causes the resilient means to exert slightly more pressure on the following cylindrical harrow as it moves downwardly between ridges and to thus exert more uniform pressure. As the harrow bar moves down one side of a ridge, less pressure is exerted on the following harrow by the resilient means as it moves up the other side of the ridge. Again this tends to equalize the pressure exerted by the harrow.

The invention is particularly directed toward a cultivator having a main frame with first support means pivotally mounted thereon and extending rearwardly from the main frame. The first support means carry first cultivating means at its rear end. A second support means is pivotally mounted on the frame and extends rearwardly therefrom above the first support means. Second cultivating means spaced rearwardly from the first cultivating means are carried by the second support means at its rear end, spaced. Resilient means connect the first and second cultivating means together in a manner whereby movement of the first cultivating means in an upward direction automatically increases the downward pressure applied by the second cultivating means.

A preferred embodiment of the invention will now be described in detail having reference to the accompanying drawings in which.

Figure 1:
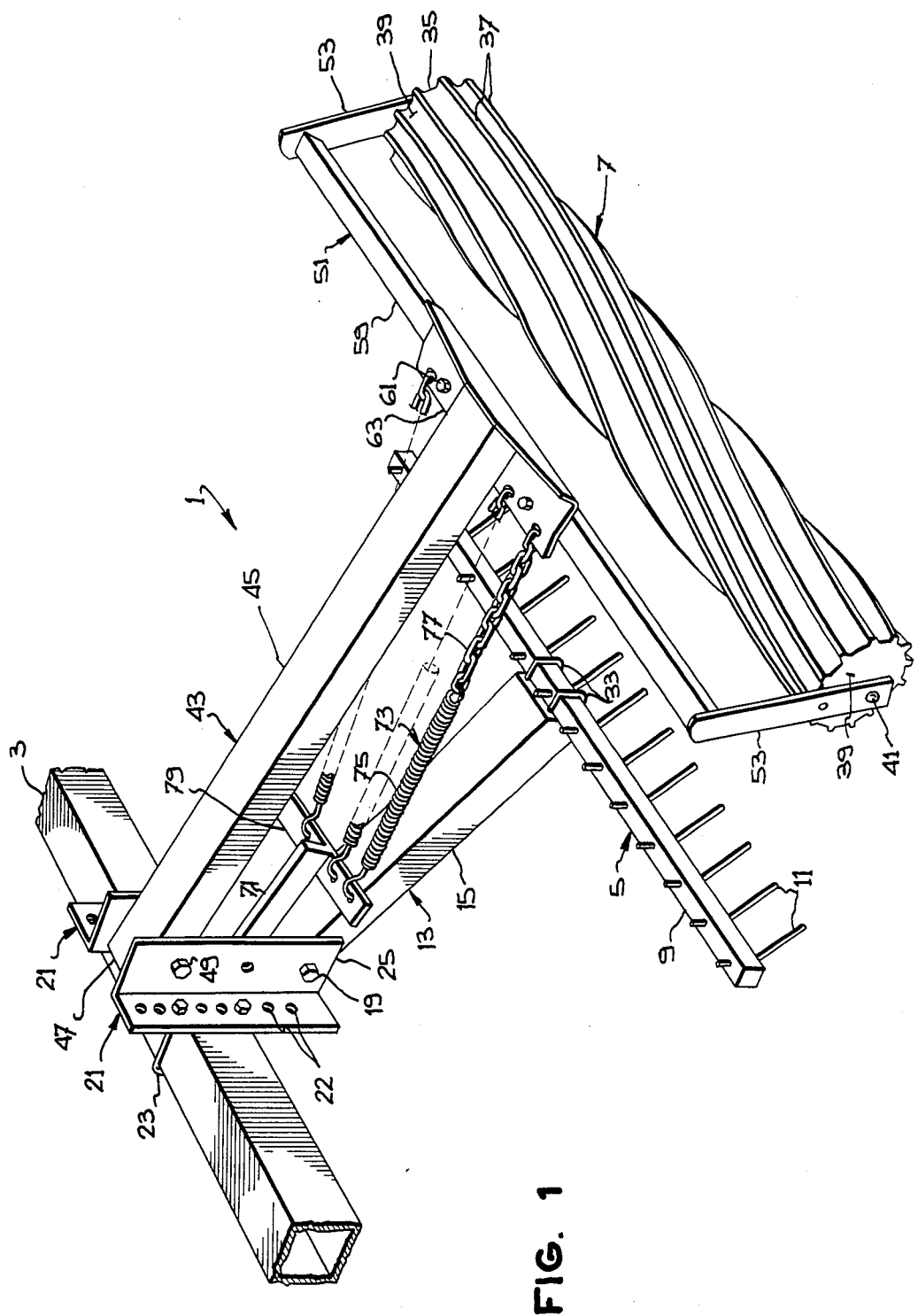
FIG. 1 is a perspective view of a cultivator according to the invention.
Figure 2:
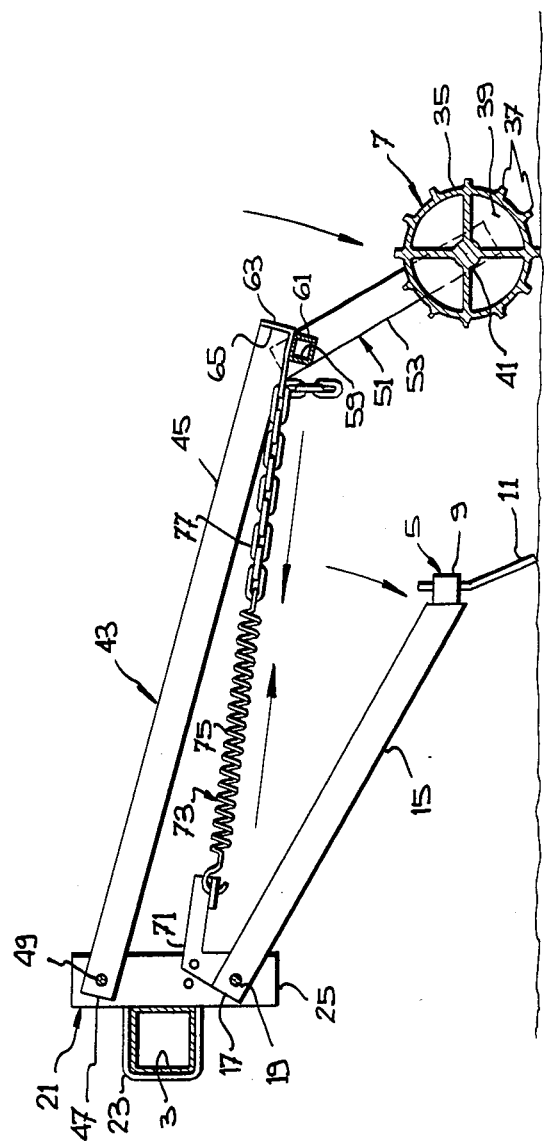
FIG. 2 is a side view of the cultivator shown in FIG. 1.

The cultivator 1 as shown in the drawings, has a main frame 3 through which the cultivator is pulled by a tractor or similar vehicle. The cultivator 1 also has first cultivating means 5 and second cultivating means 7 carried by the main frame 3.

The first cultivating means 5 comprises a harrow bar 9 having a plurality of equally-spaced rigid tines 11 attached thereto and projecting downwardly, laterally and rearwardly from the harrow bar 9 to break up the earth. The harrow bar 9 is mounted rearwardly of the frame 3 in a generally horizontal position, and transverse to the direction of travel of the cultivator during use, by means of a first support 13. The first support 13 comprises a first support member 15. The support member 15 is pivotally mounted adjacent its front end 17 by a bolt 19 to a pair of spaced-apart vertical mounting members 21. The mounting members 21 are in turn detachably mounted to the main frame 3 by U-bolts 23. A plurality of holes 22 can be provided in the mounting members to receive the U-bolts 23 at different positions and thus to adjust the height of the members 21 with respect to the main frame 3.

The front end 17 of support member 15 is positioned between the mounting members 21 near their lower ends 25, and the bolt 19 is passed through aperatures (not shown) in the mounting members 21, and through an aligned aperature (not shown) in the support member 15, to pivotally connect it to frame 3. The rear end 27 of support member 15 is connected to a mounting plate 29 having a lower, horizontal flange 31. The harrow bar 9 of the first cultivating means 5 is centered with respect to the plate 29 and then detachably connected over the flange 31 by U-bolts 33. The cultivating means 5 on the rear end of support member 15, can pivot up and down about the bolt 19 to follow the contour of the land.

The second cultivating means 7 comprises at least one cylindrical harrow 35 having helical blades 37 mounted on a series of spaced-apart circular disks 39, two of which are shown, which in turn are mounted on an axial shaft 41. The harrow 35 is mounted rearwardly of the frame 3, and harrow bar 9, in a generally horizontal position and parallel to the harrow bar 9, by means of a second support 43.

The second support 43 includes a second support member 45. The front end 47 of the second support member 45 is positioned between the mounting members 21 and above the front end of the first support member 15. A bolt 49 passes through aligned aperatures (not shown) in both mounting members 21 and in the support member 45 to pivotally connect the member 45 to the frame 3. The second support member 45 passes over the first support member 15 and is connected to the harrow 35 by a U-shaped frame 51. The short arms 53 of frame 51 rotatably support the harrow 35 by the ends of the axial shaft 41. A cross-piece 59 forming part of the frame 51 is centrally mounted by U-bolts 61 to a mounting plate 63 fixed on the rear end 65 of second support member 45. The second cultivating means 7 on the rear end of second support member 45 can pivot up and down about the pivot bolt 49 to follow the contour of the land rearwardly of the first cultivating means 5.

In accordance with the present invention, resilient means connect the first and second cultivating means together in a manner whereby movement of the first cultivating means in an upward direction will automatically increase the downward pressure exerted by the second cultivating means, and conversely whereby downward movement of the first cultivating means will automatically decrease the downward pressure exerted by the second cultivating means. To this end, an arm 71 is fixed to the top of the first support member 15 adjacent its front end 17. The arm 71 extends upwardly a short distance and then rearwardly a short distance toward the rear end 65 of second support member 45. One or more resilient means 73 connect the arm 71 to the mounting plate 63 on the end of second support member 45. Each resilient means 73 can comprise a spring 75 joined at one end to one end of a chain 77. The other end of spring 75 is hooked to the arm 71, or to a cross plate 79 on the end of arm 71 if more than one resilient means 73 are used. The other end of chain 77 is fastened to the mounting plate 63 via a link of chain 77 which is detachably fastened to the plate 63 to adjust the normal downward pressure applied to the harrow 35.

During use of the cultivator, when the leading first cultivating means 5 moves up a slight rise coming out of a trough, this upward movement will pivot the arm 71 upwardly and forwardly thereby increasing the tension in the resilient means 73 and causing the harrow 35 to press with more equal pressure as the harrow 35 moves down into the trough.

Conversely, when the first cultivating means 5 moves down into the next trough, this downward movement will lessen the pressure exerted by the harrow 35 as it moves up out of the previous trough thereby again tending to equalize the pressure exerted by the harrow.

Thus, even though the cultivator may travel over uneven ground, the pressure exerted by the harrow 35 is more uniform.

The embodiments of the invention in which an exlusive property or privilege is claimed are defined as follows:

1. A cultivator comprising:
   a main frame;
   a first support means pivotally mounted on the frame and extending rearwardly therefrom, said first support means carrying an upwardly and rearwardly extending arm adjacent the frame;
   a harrow bar mounted rearwardly on the first support means;
   a second support means pivotally mounted on the frame and extending rearwardly therefrom above the first support means;
   a cylindrical harrow mounted rearwardly on the second support means and spaced rearwardly from the harrow bar, said cylindrical harrow having helical blades thereon; and
   at least one resilient means connecting the harrow bar to the cylindrical harrow in a manner whereby movement of the harrow bar in an upward direction automatically increases the downward pressure applied by the cylindrical harrow, said resilient means being fastened at one end to the arm carried by said first support means and at its other end to the second support means near the cylindrical harrow, said resilient means comprising a spring attached at one end to one end of a length of chain.

* * * * *